US008605732B2

(12) United States Patent
Parker et al.

(10) Patent No.: US 8,605,732 B2
(45) Date of Patent: *Dec. 10, 2013

(54) METHOD OF PROVIDING VIRTUAL ROUTER FUNCTIONALITY

(75) Inventors: David K Parker, Gloucestershire (GB); Denton Gentry, Fremont, CA (US)

(73) Assignee: Extreme Networks, Inc., Santa Clara, CA (US)

( * ) Notice: Subject to any disclaimer, the term of this patent is extended or adjusted under 35 U.S.C. 154(b) by 236 days.

This patent is subject to a terminal disclaimer.

(21) Appl. No.: 13/027,973

(22) Filed: Feb. 15, 2011

(65) Prior Publication Data

US 2012/0207169 A1   Aug. 16, 2012

(51) Int. Cl.
H04L 12/28   (2006.01)

(52) U.S. Cl.
USPC .................................................. 370/395.53

(58) Field of Classification Search
USPC ............ 370/246, 389, 392, 395.53, 401, 469
See application file for complete search history.

(56) References Cited

U.S. PATENT DOCUMENTS

| 4,025,901 A | 5/1977 | Bachman et al. |
| 4,042,912 A | 8/1977 | Bachman et al. |
| 4,480,307 A | 10/1984 | Budde et al. |
| 4,654,654 A | 3/1987 | Butler et al. |
| 4,755,986 A | 7/1988 | Hirata |
| 5,072,443 A | 12/1991 | Hahne et al. |
| 5,282,270 A | 1/1994 | Oppenheimer et al. |
| 5,367,650 A | 11/1994 | Sharangpani et al. |
| 5,473,599 A | 12/1995 | Li et al. |
| 5,524,258 A | 6/1996 | Corby, Jr. et al. |
| 5,577,256 A | 11/1996 | Muramatsu et al. |
| 5,710,923 A | 1/1998 | Jennings et al. |
| 5,764,636 A | 6/1998 | Edsall |
| 5,784,569 A | 7/1998 | Miller et al. |
| 5,790,799 A | 8/1998 | Mogul et al. |
| 5,852,607 A | 12/1998 | Chin |
| 5,923,660 A | 7/1999 | Shemla et al. |
| 5,943,493 A | 8/1999 | Teich et al. |

(Continued)

FOREIGN PATENT DOCUMENTS

| CN | 1604568 | 4/2005 |
| CN | 101352003 | 1/2009 |

(Continued)

OTHER PUBLICATIONS

European Search Report and Written Opinion for European Patent Application No. 11162449.0, Mailed Jul. 7, 2011, 11 pages.

(Continued)

Primary Examiner — Dang Ton
Assistant Examiner — Nourali Mansoury
(74) Attorney, Agent, or Firm — Blakely, Sokoloff, Taylor & Zafman

(57) ABSTRACT

A method of presenting different virtual routers to different end users, classes of service, or packets is provided. An incoming packet is received having a VLAN field and at least one additional field. A key is formed from the VLAN field and at least one other packet field, and mapped into a virtual router identifier (VRID) using an indirection mapping process. The VRID identifies a particular virtual router configuration from a plurality of possible virtual router configurations. A networking device is configured to have the particular virtual router configuration identified by the VRID, and the packet is then forwarded by the configured device.

20 Claims, 5 Drawing Sheets

(56) References Cited

U.S. PATENT DOCUMENTS

| | | |
|---|---|---|
| 5,999,518 A | 12/1999 | Nattkemper et al. |
| 6,002,881 A | 12/1999 | York et al. |
| 6,034,957 A | 3/2000 | Haddock et al. |
| 6,098,109 A | 8/2000 | Kotzur et al. |
| 6,148,381 A | 11/2000 | Jotwani |
| 6,172,980 B1 | 1/2001 | Flanders et al. |
| 6,173,333 B1 | 1/2001 | Jolitz et al. |
| 6,178,491 B1 | 1/2001 | Ben-Ephraim et al. |
| 6,185,214 B1 | 2/2001 | Schwartz et al. |
| 6,208,649 B1 | 3/2001 | Kloth |
| 6,226,291 B1 | 5/2001 | Chauvel et al. |
| 6,256,314 B1 | 7/2001 | Rodrig et al. |
| 6,266,705 B1 | 7/2001 | Ullum et al. |
| 6,275,861 B1 | 8/2001 | Chaudri et al. |
| 6,292,838 B1 | 9/2001 | Nelson |
| 6,295,299 B1 | 9/2001 | Haddock et al. |
| 6,304,924 B1 | 10/2001 | Varma |
| 6,347,347 B1 | 2/2002 | Brown et al. |
| 6,351,801 B1 | 2/2002 | Christie et al. |
| 6,362,990 B1 | 3/2002 | Gibson et al. |
| 6,381,162 B1 | 4/2002 | Peterson |
| 6,381,242 B1 | 4/2002 | Maher, III et al. |
| 6,384,750 B1 | 5/2002 | Brown |
| 6,397,260 B1 | 5/2002 | Wils et al. |
| 6,463,067 B1 | 10/2002 | Hebb et al. |
| 6,466,983 B1 | 10/2002 | Strazza |
| 6,502,185 B1 | 12/2002 | Keller et al. |
| 6,515,963 B1 | 2/2003 | Bechtolsheim et al. |
| 6,530,010 B1 | 3/2003 | Hung et al. |
| 6,553,002 B1 | 4/2003 | Bremer et al. |
| 6,564,238 B1 | 5/2003 | Kim et al. |
| 6,570,877 B1 | 5/2003 | Kloth et al. |
| 6,631,465 B1 | 10/2003 | Chen et al. |
| 6,643,821 B2 | 11/2003 | Karim et al. |
| 6,650,642 B1 | 11/2003 | Sugai et al. |
| 6,650,644 B1 | 11/2003 | Colley et al. |
| 6,658,002 B1 | 12/2003 | Ross et al. |
| 6,661,791 B1 | 12/2003 | Brown |
| 6,665,755 B2 | 12/2003 | Modelski et al. |
| 6,697,751 B2 | 2/2004 | Skingsley et al. |
| 6,714,987 B1 | 3/2004 | Amin et al. |
| 6,721,316 B1 | 4/2004 | Epps et al. |
| 6,731,652 B2 | 5/2004 | Ramfelt et al. |
| 6,735,670 B1 | 5/2004 | Bronstein et al. |
| 6,738,892 B1 | 5/2004 | Coon et al. |
| 6,763,023 B1 | 7/2004 | Gleeson et al. |
| 6,765,881 B1 | 7/2004 | Rajakarunanayake |
| 6,771,594 B1 | 8/2004 | Upadrasta |
| 6,775,280 B1 | 8/2004 | Ma et al. |
| 6,781,601 B2 | 8/2004 | Cheung |
| 6,781,992 B1 | 8/2004 | Rana et al. |
| 6,792,502 B1 | 9/2004 | Pandya et al. |
| 6,795,435 B1 | 9/2004 | Jouppi et al. |
| 6,798,746 B1 | 9/2004 | Kloth et al. |
| 6,807,156 B1 | 10/2004 | Veres et al. |
| 6,807,175 B1 | 10/2004 | Jennings et al. |
| 6,807,183 B1 | 10/2004 | Chow et al. |
| 6,842,457 B1 | 1/2005 | Malalur |
| 6,842,791 B2 | 1/2005 | Navada et al. |
| 6,871,262 B1 | 3/2005 | Oren et al. |
| 6,882,642 B1 | 4/2005 | Kejriwal et al. |
| 6,888,797 B1 | 5/2005 | Cao et al. |
| 6,914,905 B1 | 7/2005 | Yip et al. |
| 6,917,617 B2 | 7/2005 | Jin et al. |
| 6,918,053 B1 | 7/2005 | Thatte et al. |
| 6,957,258 B2 | 10/2005 | Maher, III et al. |
| 6,975,581 B1 | 12/2005 | Medina et al. |
| 6,976,158 B2 | 12/2005 | Catherwood et al. |
| 6,980,552 B1 | 12/2005 | Belz et al. |
| 6,993,663 B1 | 1/2006 | Paya et al. |
| 6,999,462 B1 | 2/2006 | Acharya |
| 7,002,974 B1 | 2/2006 | Deerman et al. |
| 7,006,438 B2 | 2/2006 | West et al. |
| 7,007,151 B1 | 2/2006 | Ely et al. |
| 7,016,979 B2 * | 3/2006 | He et al. .......... 709/246 |
| 7,042,848 B2 | 5/2006 | Santiago et al. |
| 7,062,398 B1 | 6/2006 | Rothberg |
| 7,062,641 B1 | 6/2006 | Devanagondi et al. |
| 7,079,407 B1 | 7/2006 | Dimitrelis |
| 7,079,538 B2 | 7/2006 | Gazsi et al. |
| 7,092,354 B2 | 8/2006 | Jensen |
| 7,111,101 B1 | 9/2006 | Bourke et al. |
| 7,114,053 B2 | 9/2006 | Goss |
| 7,116,680 B1 | 10/2006 | Kramer et al. |
| 7,117,126 B2 | 10/2006 | Floyd et al. |
| 7,120,733 B1 | 10/2006 | Mick, Jr et al. |
| 7,139,271 B1 | 11/2006 | Parruck et al. |
| 7,149,216 B1 | 12/2006 | Cheriton |
| 7,152,191 B2 | 12/2006 | Kessler et al. |
| 7,154,902 B1 | 12/2006 | Sikdar |
| 7,159,030 B1 | 1/2007 | Elzur |
| 7,177,276 B1 | 2/2007 | Epps et al. |
| 7,187,694 B1 | 3/2007 | Liao |
| 7,190,696 B1 | 3/2007 | Manur et al. |
| 7,206,430 B2 | 4/2007 | Pelly et al. |
| 7,212,837 B1 | 5/2007 | Calhoun et al. |
| 7,224,701 B2 | 5/2007 | Ozguner |
| 7,236,492 B2 | 6/2007 | Davis et al. |
| 7,248,584 B2 | 7/2007 | Hooper |
| 7,248,585 B2 | 7/2007 | Kohn et al. |
| 7,260,648 B2 | 8/2007 | Tingley et al. |
| 7,274,693 B1 | 9/2007 | Kloth et al. |
| 7,286,520 B2 | 10/2007 | Takeda et al. |
| 7,286,565 B1 | 10/2007 | Carr |
| 7,292,591 B2 | 11/2007 | Parker et al. |
| 7,293,113 B1 | 11/2007 | Krishna et al. |
| 7,295,576 B2 | 11/2007 | Chauvel |
| 7,296,100 B1 | 11/2007 | Venkatesh et al. |
| 7,304,991 B2 | 12/2007 | Basso et al. |
| 7,304,996 B1 | 12/2007 | Swenson et al. |
| 7,340,535 B1 | 3/2008 | Alam |
| 7,385,984 B2 | 6/2008 | Parker et al. |
| 7,444,405 B2 | 10/2008 | Gangadharan |
| 7,453,874 B1 | 11/2008 | Nguyen |
| 7,463,628 B2 | 12/2008 | Parker et al. |
| 7,487,938 B2 | 2/2009 | Brady, Jr. et al. |
| 7,489,699 B2 | 2/2009 | Sindhu et al. |
| 7,502,374 B1 | 3/2009 | Parker et al. |
| 7,515,589 B2 | 4/2009 | Bacher et al. |
| 7,522,516 B1 | 4/2009 | Parker |
| 7,522,592 B2 * | 4/2009 | Kanetake et al. .......... 370/389 |
| 7,539,750 B1 | 5/2009 | Parker et al. |
| 7,554,978 B1 | 6/2009 | Parker |
| 7,561,531 B2 | 7/2009 | Lewites et al. |
| 7,580,350 B1 | 8/2009 | Parker |
| 7,606,263 B1 | 10/2009 | Parker |
| 7,613,209 B1 | 11/2009 | Nguyen et al. |
| 7,649,879 B2 | 1/2010 | Parker |
| 7,675,915 B2 | 3/2010 | Parker et al. |
| 2001/0005876 A1 | 6/2001 | Srinivasan et al. |
| 2001/0015976 A1 | 8/2001 | Harasawa et al. |
| 2001/0020266 A1 | 9/2001 | Kojima et al. |
| 2001/0025315 A1 | 9/2001 | Jolitz |
| 2001/0028651 A1 | 10/2001 | Murase |
| 2001/0036196 A1 | 11/2001 | Blightman et al. |
| 2001/0043610 A1 | 11/2001 | Nemirovsky et al. |
| 2001/0048661 A1 | 12/2001 | Clear et al. |
| 2002/0037729 A1 | 3/2002 | Kitazawa et al. |
| 2002/0061012 A1 | 5/2002 | Thi et al. |
| 2002/0075805 A1 | 6/2002 | Gupta et al. |
| 2002/0085560 A1 | 7/2002 | Cathey et al. |
| 2002/0095512 A1 | 7/2002 | Rana et al. |
| 2002/0103925 A1 | 8/2002 | Sheth et al. |
| 2002/0103942 A1 | 8/2002 | Comeau |
| 2002/0105909 A1 | 8/2002 | Flanagan et al. |
| 2002/0107908 A1 | 8/2002 | Dharanikota |
| 2002/0109615 A1 | 8/2002 | Abdat |
| 2002/0122386 A1 | 9/2002 | Calvignac et al. |
| 2002/0126673 A1 | 9/2002 | Dagli et al. |
| 2002/0147961 A1 | 10/2002 | Charters et al. |
| 2002/0163909 A1 | 11/2002 | Sarkinen et al. |
| 2002/0163935 A1 | 11/2002 | Paatela et al. |
| 2002/0184387 A1 | 12/2002 | Yamaya et al. |
| 2002/0191605 A1 | 12/2002 | Lunteren et al. |

(56) References Cited

U.S. PATENT DOCUMENTS

| | | |
|---|---|---|
| 2002/0194363 A1 | 12/2002 | Jha |
| 2003/0005143 A1 | 1/2003 | Elzur et al. |
| 2003/0005210 A1 | 1/2003 | Thummalapally et al. |
| 2003/0026259 A1 | 2/2003 | Brown |
| 2003/0028713 A1 | 2/2003 | Khanna et al. |
| 2003/0036896 A1 | 2/2003 | Skingsley et al. |
| 2003/0037227 A1 | 2/2003 | Nomura |
| 2003/0046423 A1 | 3/2003 | Narad et al. |
| 2003/0056014 A1 | 3/2003 | Verberkt et al. |
| 2003/0067903 A1 | 4/2003 | Jorgensen |
| 2003/0069973 A1 | 4/2003 | Ganesan et al. |
| 2003/0126286 A1 | 7/2003 | Lee |
| 2003/0154380 A1 | 8/2003 | Richmond et al. |
| 2003/0165144 A1 | 9/2003 | Wang |
| 2003/0169612 A1 | 9/2003 | Hu |
| 2003/0169737 A1 | 9/2003 | Lavigne et al. |
| 2003/0185220 A1 | 10/2003 | Valenci |
| 2003/0193949 A1 | 10/2003 | Kojima et al. |
| 2003/0196081 A1 | 10/2003 | Savarda et al. |
| 2003/0204840 A1 | 10/2003 | Wu |
| 2003/0214905 A1 | 11/2003 | Solomon et al. |
| 2003/0214956 A1 | 11/2003 | Navada et al. |
| 2003/0223361 A1 | 12/2003 | Hussain et al. |
| 2003/0225907 A1 | 12/2003 | Krishnan |
| 2004/0003110 A1 | 1/2004 | Ozguner |
| 2004/0015683 A1 | 1/2004 | Emma et al. |
| 2004/0049582 A1 | 3/2004 | Noel, Jr. et al. |
| 2004/0066780 A1 | 4/2004 | Shankar et al. |
| 2004/0100956 A1 | 5/2004 | Watanabe |
| 2004/0105423 A1 | 6/2004 | Koehler et al. |
| 2004/0120173 A1 | 6/2004 | Regev et al. |
| 2004/0120435 A1 | 6/2004 | Yang et al. |
| 2004/0174898 A1 | 9/2004 | Kadambi et al. |
| 2004/0202162 A1 | 10/2004 | Vu |
| 2004/0205056 A1 | 10/2004 | Mori et al. |
| 2004/0205753 A1 | 10/2004 | Moore |
| 2004/0208197 A1 | 10/2004 | Viswanathan |
| 2004/0246981 A1 | 12/2004 | He et al. |
| 2004/0258062 A1 | 12/2004 | Narvaez |
| 2005/0015423 A1 | 1/2005 | D'Arcy et al. |
| 2005/0021740 A1 | 1/2005 | Bar et al. |
| 2005/0033941 A1 | 2/2005 | Joyce et al. |
| 2005/0044199 A1 | 2/2005 | Shiga et al. |
| 2005/0044338 A1 | 2/2005 | Goss |
| 2005/0055339 A1 | 3/2005 | Richardson |
| 2005/0074009 A1 | 4/2005 | Kanetake et al. |
| 2005/0086353 A1 | 4/2005 | Shirakawa et al. |
| 2005/0094572 A1 | 5/2005 | Mimura et al. |
| 2005/0111360 A1 | 5/2005 | Jin et al. |
| 2005/0117576 A1 | 6/2005 | McDysan et al. |
| 2005/0149633 A1 | 7/2005 | Natarajan et al. |
| 2005/0159166 A1 | 7/2005 | Jonsson et al. |
| 2005/0180429 A1 | 8/2005 | Ghahremani et al. |
| 2005/0190639 A1 | 9/2005 | Hu |
| 2005/0198362 A1 | 9/2005 | Navada et al. |
| 2005/0220011 A1 | 10/2005 | Parker et al. |
| 2005/0220094 A1 | 10/2005 | Parker et al. |
| 2005/0226242 A1 | 10/2005 | Parker |
| 2005/0281191 A1 | 12/2005 | McGee et al. |
| 2006/0007917 A1 | 1/2006 | Saito et al. |
| 2006/0034292 A1 | 2/2006 | Wakayama et al. |
| 2006/0039374 A1 | 2/2006 | Belz et al. |
| 2006/0056420 A1 | 3/2006 | Okuda et al. |
| 2006/0092950 A1 | 5/2006 | Arregoces et al. |
| 2006/0106934 A1 | 5/2006 | Figaro et al. |
| 2006/0209796 A1 | 9/2006 | Scott |
| 2006/0233168 A1 | 10/2006 | Lewites et al. |
| 2007/0153808 A1 | 7/2007 | Parker et al. |
| 2007/0204036 A1 | 8/2007 | Mohaban et al. |
| 2007/0266374 A1 | 11/2007 | Grisenthwaite et al. |
| 2007/0291754 A1 | 12/2007 | Okagawa et al. |
| 2007/0291791 A1 | 12/2007 | English et al. |
| 2008/0034112 A1 | 2/2008 | Imai et al. |
| 2008/0043628 A1 | 2/2008 | Parker et al. |
| 2008/0049774 A1 | 2/2008 | Swenson et al. |
| 2008/0075078 A1 | 3/2008 | Watanabe |
| 2008/0186968 A1 | 8/2008 | Farinacci et al. |
| 2008/0205264 A1 | 8/2008 | Rorie |
| 2008/0222094 A1 | 9/2008 | Cox |
| 2009/0213856 A1 | 8/2009 | Paatela et al. |
| 2010/0054256 A1 | 3/2010 | Parker |

FOREIGN PATENT DOCUMENTS

| | | |
|---|---|---|
| EP | 1601137 | 11/2005 |
| JP | 2001345864 | 12/2001 |
| JP | 2002176431 | 6/2002 |
| JP | 2002325090 | 11/2002 |
| JP | 2002335265 | 11/2002 |
| JP | 2003244185 | 8/2003 |
| JP | 2004187282 | 7/2004 |
| JP | 2005117171 | 4/2005 |
| WO | WO-03081857 | 10/2003 |
| WO | WO-2005069551 | 7/2005 |
| WO | WO-2005094343 | 10/2005 |
| WO | WO-2005099178 | 10/2005 |
| WO | WO-2005099179 | 10/2005 |
| WO | WO-2005099192 | 10/2005 |
| WO | WO-2007079035 | 7/2007 |
| WO | WO2007079035 | 7/2007 |

OTHER PUBLICATIONS

Non-Final Office Action for Japanese Patent Application No. 2008-548656, Mailed Apr. 5, 2011, 4 pages.

Non-Final Office Action for Chinese Patent Application No. 200680050164.9 Mailed Mar. 16, 2011, 11 Pages.

Notice of Allowance and Fees for U.S. Appl. No. 10/814,552, Mailed Nov. 14, 2007, 13 Pages.

Supplemental Notice of Allowance and Fees for U.S. Appl. No. 10/814,552, Mailed Dec. 18, 2007, 8 Pages.

Non-Final Office Action for U.S. Appl. No. 11/860,045 Mailed Nov. 18, 2009, 9 Pages.

Notice of Allowance and Fees for U.S. Appl. No. 11/850,045 Mailed Mar. 29, 2010, 11 Pages.

Non-Final Office Action for U.S. Appl. No. 10/814,774 Mailed Dec. 3, 2009, 19 Pages.

Non-Final Office Action for U.S. Appl. No. 10/814,774 Mailed Nov. 9, 2007, 20 Pages.

Final Office Action for U.S. Appl. No. 10/814,774 Mailed Aug. 19, 2008, 18 Pages.

Final Office Action for U.S. Appl. No. 10/814,774 Mailed Aug. 3, 2009, 16 Pages.

Final Office Action for U.S. Appl. No. 10/814,774 Mailed Apr. 21, 2010, 7 pages.

Notice of Allowance and Fees for U.S. Appl. No. 10/813,731 Mailed Aug. 1, 2007, 11 Pages.

Supplemental Notice of Allowance and Fees for U.S. Appl. No. 10/813,731 Mailed Aug. 20, 2007, 4 Pages.

Non-Final Office Action for U.S. Appl. No. 11/924,500 Mailed Aug. 12, 2009, 9 Pages.

Final Office Action for U.S. Appl. No. 11/924,500 Mailed Feb. 4, 2010, 10 Pages.

Notice of Allowance and Fees for U.S. Appl. No. 10/814,725 Mailed Sep. 6, 2007, 15 Pages.

Notice of Allowance and Fees for U.S. Appl. No. 11/924,523 Mailed Dec. 18, 2009, 10 Pages.

Non-Final Office Action for U.S. Appl. No. 10/814,556 Sep. 17, 2007, 19 Pages.

Final Office Action for U.S. Appl. No. 10/814,556 Mailed Apr. 29, 2008, 20 Pages.

Non-Final Office Action for U.S. Appl. No. 10/814,556 Mailed Jan. 5, 2009, 24 Pages.

Final Office Action for U.S. Appl. No. 10/814,556 Mailed Jun. 22, 2009, 28 Pages.

Non-Final Office Action for U.S. Appl. No. 10/814,556 Mailed Jan. 5, 2010, 28 Pages.

Non-Final Office Action for U.S. Appl. No. 10/835,598 Mailed Mar. 24, 2009, 14 Pages.

(56) References Cited

OTHER PUBLICATIONS

Non-Final Office Action for U.S. Appl. No. 10/835,598 Mailed Jun. 20, 2008, 22 Pages.
Notice of Allowance and Fees for U.S. Appl. No. 10/835,598 Mailed Nov. 5, 2009, 8 Pages.
Notice of Allowance and Fees for U.S. Appl. No. 10/814,728 Mailed Dec. 17, 2008, 4 Pages.
Non-Final Office Action for U.S. Appl. No. 10/814,728 Mailed May 5, 2008, 38 Pages.
Non-Final Office Action for U.S. Appl. No. 10/814,545 Mailed Jul. 18, 2007, 8 Pages.
Non-Final Office Action for U.S. Appl. No. 10/814,545 Mailed Feb. 19, 2008, 6 Pages.
Notice of Allowance and Fees for U.S. Appl. No. 10/814,545 Mailed Sep. 11, 2008, 8 Pages.
Non-Final Office Action for U.S. Appl. No. 10/814,729, Mailed Oct. 20, 2008, 23 Pages.
Notice of Allowance and Fees for U.S. Appl. No. 10/814,729 Mailed Jul. 10, 2009, 11 Pages.
Notice of Allowance and Fees for U.S. Appl. No. 10/814,729 Mailed Sep. 3, 2009, 9 Pages.
Non-Final Office Action for U.S. Appl. No. 10/814,727 Mailed Aug. 22, 2007, 6 Pages.
Non-Final Office Action for U.S. Appl. No. 10/814,727 Mailed Feb. 29, 2008, 6 Pages.
Notice of Allowance and Fees for U.S. Appl. No. 10/814,727 Mailed Oct. 20, 2008, 13 Pages.
Non-Final Office Action for U.S. Appl. No. 10/835,532 Mailed May 5, 2008, 25 Pages.
Non-Final Office Action for U.S. Appl. No. 10/835,532 Mailed Jan. 21, 2009, 14 Pages.
Notice of Allowance and Fees for U.S. Appl. No. 10/835,532 Mailed Jun. 25, 2009, 7 Pages.
Non-Final Office Action for U.S. Appl. No. 10/835,272 Mailed Mar. 12, 2008, 26 Pages.
Final Office Action for U.S. Appl. No. 10/835,272 Mailed Dec. 23, 2008, 19 Pages.
Notice of Allowance and Fees for U.S. Appl. No. 10/835,272 Mailed Jul. 9, 2009, 6 Pages.
Non-Final Office Action for U.S. Appl. No. 11/324,205 Mailed Oct. 2, 2008, 18 Pages.
Final Office Action for U.S. Appl. No. 11/324,205 Mailed Jun. 1, 2009, 23 Pages.
Non-Final Office Action for U.S. Appl. No. 11/324,205 Mailed Dec. 28, 2009, 29 Pages.
Non-Final Office Action for U.S. Appl. No. 10/834,566 Mailed Oct. 3, 2007, 11 Pages.
Final Office Action for U.S. Appl. No. 10/834,566 Mailed Apr. 29, 2008, 13 Pages.
Notice of Allowance and Fees for U.S. Appl. No. 10/834,566 Mailed Dec. 19, 2008, 10 Pages.
Non-Final Office Action for U.S. Appl. No. 10/835,271 Mailed Jan. 29, 2008, 16 Pages.
Final Office Action for U.S. Appl. No. 10/835,271 Mailed Jul. 22, 2008, 12 Pages.
Non-Final Office Action for U.S. Appl. No. 10/835,271 Mailed Mar. 13, 2009, 14 pages.
Notice of Allowance and Fees for U.S. Appl. No. 10/835,271 Mailed Sep. 2, 2009, 4 Pages.
Non-Final Office Action for U.S. Appl. No. 10/834,576 Mailed Jan. 11, 2008, 13 Pages.
Non-Final Office Action for U.S. Appl. No. 10/834,576 Mailed Oct. 1, 2008, 14 Pages.
Notice of Allowance and Fees for U.S. Appl. No. 10/834,576 Mailed May 14, 2009, 8 Pages.
Restriction Requirement for U.S. Appl. No. 10/834,573 Mailed Aug. 11, 2008, 6 Pages.
Final Office Action for U.S. Appl. No. 10/834,573 Mailed Jul. 7, 2009, 22 Pages.
Advisory Action for U.S. Appl. No. 10/834,573 Mailed Oct. 27, 2009, 6 Pages.
Non-Final Office Action for U.S. Appl. No. 10/835,252 Mailed Jul. 20, 2007, 14 Pages.
Non-Final Office Action for U.S. Appl. No. 10/835,252 Mailed Mar. 25, 2008, 26 Pages.
Notice of Allowance and Fees for U.S. Appl. No. 10/835,252 Mailed Jan. 5, 2009, 4 Pages.
Non-Final Office Action for U.S. Appl. No. 11/324,209 Mailed Oct. 30, 2008, 23 Pages.
Non-Final Office Action for U.S. Appl. No. 11/323,998 Mailed Feb. 18, 2009, 22 Pages.
Non-Final Office Action for U.S. Appl. No. 11/324,159 Mailed Sep. 4, 2008, 33 Pages.
Final Office Action for U.S. Appl. No. 11/324,159 Mailed Apr. 3, 2009, 28 Pages.
Non-Final Office Action for U.S. Appl. No. 11/324,159 Mailed Nov. 12, 2009, 31 Pages.
Notice of Restriction Requirement for U.S. Appl. No. 10/814,552, Mailed Aug. 10, 2007, 5 Pages.
Notice of Restriction Requirement for U.S. Appl. No. 11/814,552, Mailed Oct. 11, 2007, 5 Pages.
Non-Final Office Action for U.S. Appl. No. 10/814,774 Mailed Mar. 23, 2009, 10 Pages.
International Preliminary Report on Patentability for PCT Application PCT/US2005/010541 Mailed Oct. 2, 2008, 6 Pages.
International Search Report and WO for PCT Application PCT/US2005/010541 Mailed Aug. 25, 2008, 10 Pages.
International Preliminary Report on Patentability for PCT Application PCT/US2005/010544 Mailed Oct. 12, 2006, 5 Pages.
International Search Report and WO for PCT Application PCT/US2005/010544 Mailed Jun. 29, 2006, 9 Pages.
International Preliminary Report on Patentability for PCT Application PCT/US2005/010543 Mailed Oct. 12, 2006, 7 Pages.
International Search Report and WO for PCT Application PCT/US2005/010543 Mailed Apr. 24, 2006, 11 Pages.
International Preliminary Report on Patentability for PCT Application PCT/US2005/010435 Mailed Oct. 2, 2008, 7 Pages.
International Search Report and WO for PCT Application PCT/US2005/010435 Mailed Aug. 25, 2008, 10 Pages.
Non-Final Office Action for European Application No. 06846017.9 Mailed Apr. 16, 2009, 5 Pages.
International Search Report and WO for PCT Application PCT/US2005/049107 Mailed May 15, 2007, 14 Pages.
International Preliminary Report on Patentability for PCT Application PCT/US2006/049107 Mailed Jul. 10, 2008, 8 Pages.
Non-Final Office Action for U.S. Appl. No. 11/324,159 Mailed Jun. 8, 2010, 17 Pages.
Notice of Allowance and Fees for U.S. Appl. No. 11/324,209 Mailed Jul. 9, 2010, 12 Pages.
Non-Final Office Action for Chinese Patent Application No. 200680050164.9 Mailed Aug. 4, 2010, 19 Pages.
Non-Final Office Action for European Application No. 06846017.9 Mailed Apr. 21, 2010, 6 Pages.
Notice of Allowance for U.S. Appl. No. 11/324,159 Mailed Nov. 15, 2010, 13 Pages.
Non-Final Office Action for U.S. Appl. No. 11/324,209 Mailed Jan. 21, 2010, 23 Pages.
Non-Final Office Action for U.S. Appl. No. 11/323,998 Mailed Sep. 4, 2008, 28 Pages.
Final Office Action for U.S. Appl. No. 11/324,209 Mailed Jul. 21, 2009, 19 Pages.
Non-Final Office Action for U.S. Appl. No. 10/834,573 Mailed Jan. 21, 2010, 20 Pages.
Final Office Action for U.S. Appl. No. 11/323,998 Mailed Mar. 4, 2010, 27 Pages.
Braden, R., et al., "RFC 1071—Computing the Internet Checksum", Sep. 1988 available at http://www.faqs.org/rfcs/rfc1071.html, 20 Pages.

(56) References Cited

OTHER PUBLICATIONS

Mallory, T., et al., "RFC 1141—Incremental Updating of the Internet Checksum", Jan. 1990, available at: htt;://www.faqs.org/rfcs/rfc1141.html, 3 Pages.

Netlogic Microsystems, "Product Brief NSE5000GLQ", Copyright 2004, available at: http://www.netlogicmicro.com/datasheets/nse5000glg.html, 3 Pages.

Rijsinghani, A., et al., "RFC 1624—Computation of the Internet Checksum via Incremental Update", May 1994, available at: htt;://www.faqs.org/rfcs/rfc1624.html, 5 Pages.

Van Ess, D., "A Circular FIFO, PSoC Style", Cypress Microsystems, *Application Note AN2036, Rev. B*, Jun. 21, 2002, 5 Pages.

Zhang, Zheng, "Recovery of Memory and Process in SDM Systems: HA Issue #1", *Hewlett-Packard Co. HPL-2001-76*, Mar. 30, 2001, 16 Pages.

Non-Final Office Action for EP Patent Application No. 06846017.9, Mailed Jul. 1, 2011.

Final Office Action for Chinese Patent Application No. 200680050164.9, Mailed Jul. 26, 2011.

Non-Final Office Action for Japanese Patent Application No. 2008-548656, mailed May 15, 2012.

Notice of Allowance for European Patent Application No. 11162449.0, mailed Jun. 26, 2012.

Non-Final Office Action for Japanese Patent Application No. 2008-548656, mailed Feb. 26, 2013.

\* cited by examiner

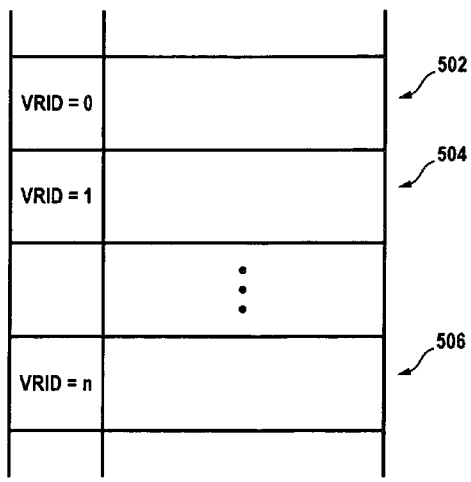
*FIG. 5*
| | | |
|---|---|---|
| 604 • TYPE [3 bits] | PORT [6 bits] | = 9 bits total |
| 606 • TYPE [3 bits] | VLAN ID [12 bits] | = 15 bits total |
| 608 • TYPE [3 bits] | VMAN ID [12 bits] | = 15 bits total |
| 610 • TYPE [3 bits] | VLAN ID [12 bits]   PORT [6 bits] | = 21 bits total |
| 612 • TYPE [3 bits] | VLAN ID [12 bits]   VMAN ID [12 bits] | = 27 bits total |
| 614 • TYPE [3 bits] | VLAN ID [12 bits]   VMAN ID [12 bits]   PORT [6 bits] | = 33 bits total |
602
*FIG. 6A*
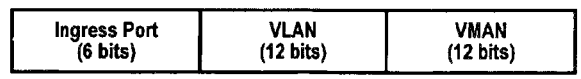
*FIG. 6B*
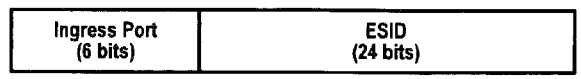
*FIG. 6C*

METHOD OF PROVIDING VIRTUAL ROUTER FUNCTIONALITY

CLAIM OF PRIORITY

This continuation application is related to, and claims priority to, U.S. patent application Ser. No. 11/324,159, entitled "METHOD OF PROVIDING VIRTUAL ROUTER FUNCTIONALITY" filed on Dec. 30, 2005, which is hereby incorporated by reference herein as though set forth in full.

This continuation application is related to U.S. patent application Ser. No. 11/324,209 entitled "MAC ADDRESS DETECTION DEVICE FOR VIRTUAL ROUTERS," filed on Dec. 30, 2005, U.S. patent application Ser. No. 11/323,998, entitled "METHOD OF PROVIDING VIRTUAL ROUTER FUNCTIONALITY THROUGH ABSTRACTED VIRTUAL IDENTIFIERS," filed on Dec. 30, 2005, U.S. patent application Ser. No. 11/324,205, entitled "METHOD OF EXTENDING DEFAULT FIXED NUMBER OF PROCESSING CYCLES IN PIPELINED PACKET PROCESSOR ARCHITECTURE," filed on Dec. 30, 2005, each of which is hereby incorporated by reference herein as though set forth in full.

TECHNICAL FIELD

This application relates generally to networking devices, and, specifically, to methods for configuring such devices so that they provide virtual router functionality, i.e., present different virtual router configurations to different end users, classes of service or packets.

RELATED ART

Virtual router functionality refers to the capability of the same physical networking device to present different virtual router configurations to different end users, classes of desired service, or packets. As a result of this capability, the same physical device appears as a plurality of different virtual routers. To implement this capability, current routers directly map a packet field of interest, typically the VLAN field, into the identifier of a particular routing table, and then use the particular routing table to route the packet. The VLAN field designates a virtual LAN, a collection of network elements that may be physically disparate but are logically related such that they may be considered part of the same LAN for OSI layer two routing/switching purposes. For example, all the network elements in a particular VLAN receive broadcasts from any other element in the VLAN at OSI layer two.

This approach, whereby the VLAN of the incoming packet is directly mapped into an identifier of a routing table, worked fine as long as different end users used non-overlapping VLANs, so that the VLAN could be used to present different virtual routers to different end users. However, as VLAN usage proliferated, different end users began using overlapping sets of VLANs, so the VLAN could no longer be used to present different virtual routers to different end users.

Another problem is that the number of virtual routers that are possible is limited by the size of the VLAN field. A VLAN of 12 bits, for example, identifies only 4K different routing tables, which may not be sufficient for certain applications.

A third problem is the lack of flexibility in this approach. If, for example, the VLAN type or format changes as network usage evolves or as network standards change, the approach would be rendered obsolete as it is tied to a particular VLAN type and format.

A fourth problem is the lack of scalability of this approach with an increase in the number of virtual routers that may need to be accommodated. With this approach, for example, an increase in the size of the VLAN field to allow for an increase in virtual routers multiplies in direct proportion the number of routing tables that need to be maintained.

SUMMARY

The invention provides a method of presenting different virtual routers to different end users, classes of service, or packets. The method may be performed in any networking device, and enables the device to provide virtual router functionality.

The method begins when a packet is received having a VLAN field and at least one additional field. Upon receipt of the packet, a key is formed from the VLAN field and at least one additional packet field, for example, a VMAN field.

The key is then mapped into a virtual router identifier (VRID) using an indirection mapping process. According to this indirect mapping process, a table having a plurality of entries, each having a content value and an index value, is accessed to locate an entry having a content value that matches the key. The index value of the matching entry is then mapped into the VRID using an associated data store element. The result is a virtual router identifier that identifies a particular virtual router configuration from a plurality of possible virtual router configurations.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood with reference to the following figures. The components in the figures are not necessarily to scale, emphasis instead being placed upon illustrating the principles of the invention. Moreover, in the figures, like reference numerals designate corresponding parts throughout the different views.

FIG. 5 illustrates a plurality of routing tables that may be used to support virtual router functionality.

FIGS. 6a, 6b and 6c illustrate examples of alternative data types that may apply depending on the type of VLAN field detected in the ingress packet.

DETAILED DESCRIPTION

Figure 1:
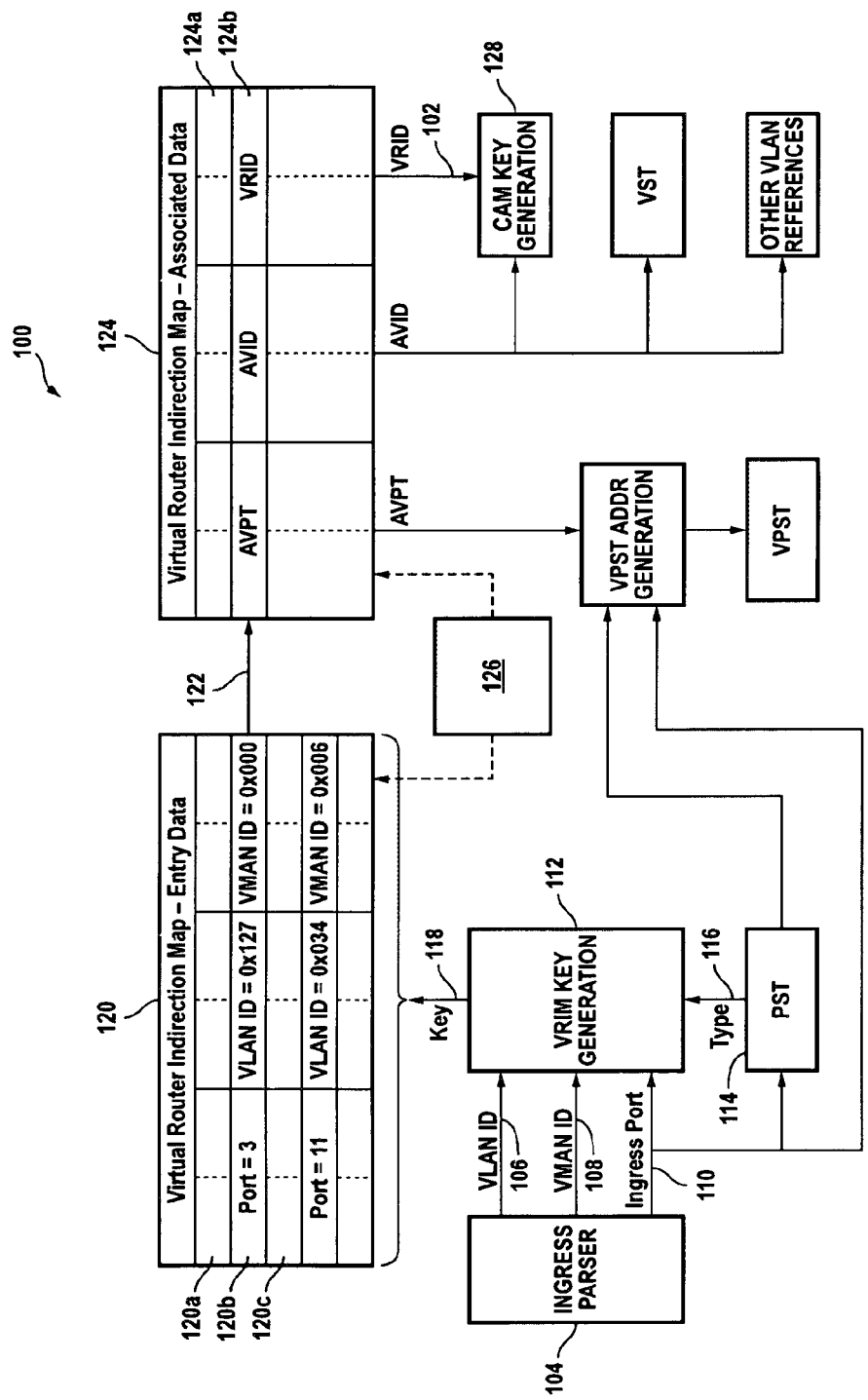
FIG. 1 is a block diagram showing the method steps, data structures and logic elements used in producing a virtual router identifier (VRID) according to one embodiment, characterized in that an indirect mapping process is used to map a key, generated from one or more packet fields, to the VRID.

Referring to FIG. 1, a block diagram depicting the steps of a method 100, performed in a networking device, of presenting different virtual router configuration to different end users, classes of service, or packets. Also shown are the data structures used in the performance of the method, and the logic elements that perform the method steps. In this particular embodiment, the method is performed in the device after the packet has been parsed by packet parser 104, thus making available for use by the method certain packet fields successfully parsed by the parser 104, including VLAN 106, VMAN 108, and ingress port 110. The method may be performed in any networking device that is capable of forwarding or classifying packets at OSI layer three or above, including but not necessarily limited to routers, switches, or combination routers/switches. For purposes of this disclosure, a "virtual router" includes both a "lightweight" virtual router, i.e., one that virtually routes at OSI layer three, and a "heavyweight" virtual router, i.e., one that virtually routes at OSI layer three, but in addition implements distinct OSI layer two functions per virtual router. Additionally, for purposes of this disclosure, the singular terms "device" or "router" include plural devices or routers, respectively.

As previously explained, the VLAN field 106 designates a virtual LAN, a collection of network elements that may be physically disparate but are logically related such that they may be considered part of the same LAN for OSI layer two routing/switching purposes. Presently, the primary usage of the VLAN terminology is to uniquely identify logically related end user equipment within a VMAN (see below).

The VMAN field 108 designates a virtual metropolitan network, a collection of network elements that may be physically disparate but are logically related such that they may be considered part of the same network. Although the term originally applied only to metropolitan networks, that usage has evolved such that the term is now used to designate any network, metropolitan or non-metropolitan. In fact, as VMAN usage has proliferated, the term is now primarily used by service providers to designate logically related infrastructure equipment. At the same time, as explained above, the VLAN terminology is now primarily used to uniquely identify logically related end user equipment within a VMAN. Significantly, as a VLAN value uniquely identifies a VLAN within a VMAN, the same VLAN value may not be used to refer to different end user equipment within a VMAN.

The ingress port number 110 is an identifier of the physical port on which the packet was received at the device.

Returning to FIG. 1, the object of the method is to determine a virtual router identifier (VRID) 102 responsive to the incoming packet, wherein the virtual router identifier 102 identifies a particular virtual router configuration from a plurality of possible virtual router configurations.

Figure 2A:
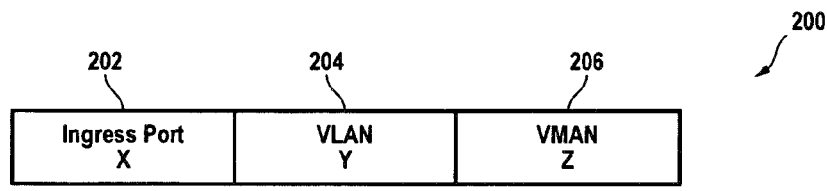
FIG. 2a illustrates an example of a key format.

The method begins when key generation logic 112 forms a key from the VLAN 106, VMAN 108 and ingress port 110 fields. In the particular embodiment illustrated, the key is formed by concatenating these three fields together, although it should be appreciated that other methods of forming the key are possible. Thus, for example, in one embodiment, an incoming packet received over ingress port X, having a VLAN of Y, and a VMAN of Z, has a key 200 formatted as illustrated in FIG. 2a, with three concatenated fields, the first field 202 holding ingress port X, the second field 204 holding VLAN Y, and the third field 206 holding VMAN Z.

Figure 2B:
FIGS. 2b-2e illustrate various examples of key types wildcarding different ones of the fields making up the key format.
Figure 2C:
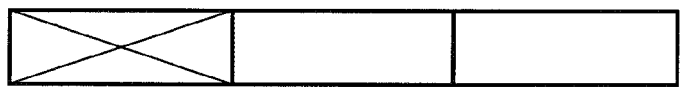
Figure 2D:
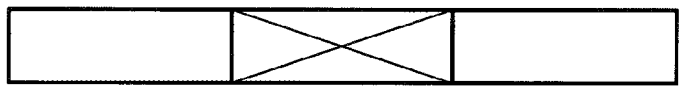
Figure 2E:
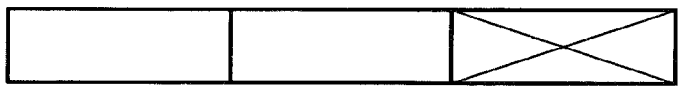

Concurrently, in one embodiment, the ingress port 110 is input to a lookup table 114 to determine a key type 116. In this embodiment, the key type functions as a mask, by indicating which of the three fields of the key are to be wildcarded, i.e., ignored in the subsequent processing, and which are to be used. In this particular embodiment, each of the three fields can be independently wild-carded or not. Thus, for example, FIG. 2b illustrates a key type in which the ingress port and VMAN fields are wildcarded (designated by the X appearing in the corresponding fields), and only the VLAN field used in the subsequent processing. Similarly, FIG. 2c illustrates a key type in which the ingress port field is wildcarded, and the VLAN and VMAN fields are used in the subsequent processing. FIG. 2d illustrates a key in which the VLAN field is wildcarded, and the ingress port and VMAN fields are used in the subsequent processing. FIG. 2e illustrates a key in which the VMAN field is wildcarded, and the ingress port and VLAN fields are used in the subsequent processing.

In the embodiment illustrated in FIG. 1, the key type 116 is determined responsive to the ingress port field 110, which forms the input to lookup table 114. The table 114 has a plurality of entries each having an index value and a content value that specifies a particular key type, for example, such as illustrated in FIGS. 2b-2e. A lookup occurs by mapping the ingress port field 110 into a particular index, looking up the entry having that index, and setting the key type to the content value of that entry. In other embodiments, the key type may be determined responsive to other packet fields and more than one packet field.

FIG. 6a illustrates an implementation where the key type is a 3 bit field, identified with numeral 602, that is appended to the key, and indicates both the format of the key and which fields of the key are to be wildcarded. For example, the key type for key 604 indicates both that the key is 9 bits, and that the VLAN and VMAN fields are to be wildcarded; the key type for key 606 indicates both that the key is 15 bits, and that the ingress port and VMAN fields are to be wildcarded; the key type for key 608 indicates both that the key is 15 bits, and that the ingress port and VLAN fields are to be wildcarded; the key type for key 610 indicates both that the key is 21 bits, and that the VMAN field is to be wildcarded; the key type for key 612 indicates both that the key is 27 bits, and that the ingress port field is to be wildcarded; and the key type for key 614 indicates that the key is 33 bits, and that none of the fields are to be wildcarded.

Moreover, as will be discussed in greater detail below, in the case where a ternary CAM is used to perform the indirection mapping process, whereby the key is indirectly mapped into a virtual router identifier, just discussed key type generation and key masking processes are unnecessary as individual fields in the content values corresponding to the ternary CAM entries can be wildcarded, i.e., set as don't care values. In the case where a binary CAM is used to perform the indirection mapping process, the just discussed key type generation and key masking processes should generally be retained.

Referring again to FIG. 1, the key 118, masked or unmasked as the case may be, is then mapped into the virtual router identifier 102 using a two-step indirection mapping process performed by logic 126. In the first step, as illustrated, a table 120 is accessed, the table having a plurality of entries 120a, 120b, 120c, each having a content value and an index value, and locating an entry having a content value that matches the key. In FIG. 1, the content value of entry 120b is shown as matching the key 118. The index value of the matching entry, identified with numeral 122, forms an input to the second step of the process.

In the second step, the index value 122 of the matching entry 120b is mapped into the virtual router identifier 102 using an associated data store element 124. The associated data store element 124 has a plurality of entries 124a, 124b, each having an index value and a content value. In one embodiment, the mapping is performed by selecting the entry in the associated data store element 124 whose index value matches the index value 122 for the matching entry in the table 120. In the particular example illustrated in FIG. 1, entry 124*b* satisfies this condition. The content value of this entry is or contains the virtual router identifier 102.

In one implementation, the table 120 is stored on a CAM, and the first step of the two-step process occurs by having the CAM search for and locate the entry 120*b* whose content value matches the key 118. In the case where the CAM is a binary CAM, i.e., a CAM where each bit in the content value of an entry can only take on the binary values "0" and "1," the previously described key type generation and masking processes should generally be performed as these functions are not available through the CAM. However, in the case where the CAM is a ternary CAM, i.e., a CAM where each bit in the content value of an entry can take on the binary values "0" and "1," but also a "don't care" value, the previously described key type generation and masking processes are optional as these functions may be performed through suitable settings of the content values of the CAM entries.

In a second implementation, the table 120 is stored in RAM, and the first step of the two-step process occurs by applying a hash function to the key 118 to determine a table index for a starting entry, and then searching the table 120, beginning with the starting entry, to locate the entry 120*b* whose content value matches the key 118.

Logic 128 configures the device in accordance with the VRID 102, and the configured device then forwards the packet. In one embodiment, as will be discussed in more detail later, logic 128 selects or generates a CAM searching key responsive to the VRID 102. The CAM searching key is used in making a classification and forwarding decision for the packet. By setting the key that is used throughout the classification and forwarding process responsive to the VRID 102, the logic 128 in effect selects the routing table that is used to route the packet.

The foregoing embodiment overcomes the problems identified at the outset with the conventional approach for providing virtual router functionality. First, since a key can be formed from a combination of a VLAN and VMAN field, and a VLAN is a unique identifier within a particular VMAN, the embodiment allows the VLAN to be used once again for virtual routing purposes.

Second, the embodiment dramatically increases the number of virtual routers that are possible. In the case, for example, where the table 120 is stored on a CAM, the number of virtual routers that can be presented is limited only by the size of the CAM. No longer does the size of the VLAN field limit the number of virtual routers than can be supported.

Third, the embodiment is flexible and easily accommodates changes in network usage or standards. Consider, for example, the recent addition of a super-wide (24 bit) VLAN field, i.e., the ESID field, to the list of permissible Ethertypes. That is handled simply by defining a new key type in the lookup table 114. For example, while the normal data type might have the format illustrated in FIG. 6*b*, i.e., 12 bits for each of the VLAN, and VMAN fields, and 6 bits for the ingress port field, when a super-wide VLAN (ESID) is detected, the data type 116 might have the format illustrated in FIG. 6*c*, i.e., a 6 bit ingress port field followed by a 24 bit ESID field. Upon encountering the key type of FIG. 6*c*, logic 112 in FIG. 1 would format the key as indicated in this figure responsive to the fields 106, 108 and 110 from the packet parser, i.e., it would assume the VLAN field 106 is a 24 bit ESID field.

Fourth, the embodiment is scaleable as an increase in the number of possible virtual routers would not necessarily require a commensurate increase in the number of routing tables that are maintained. Instead, many different key values could be mapped into the same VRID through appropriate settings of the index values associated with the entries 120*a*, 120*b*, 120*c* in the table 120. For example, in FIG. 1, if it were desired that the index values for entries 120*b* and 120*c* map into the same VRID, the index values for the entries 120*b* and 120*c* would be set to the same value.

Figure 3:
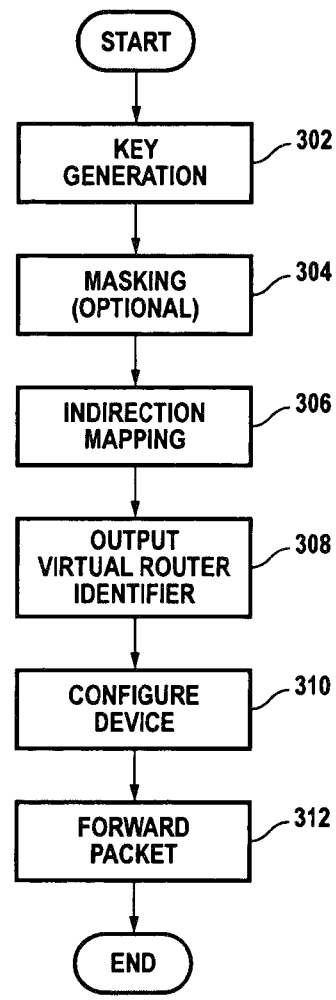
FIG. 3 is a flowchart illustrating the method steps in one embodiment, characterized in that the networking device is configured responsive to the VRID, and the packet then routed in accordance with the configured device.

FIG. 3 summarizes the steps that are performed in one embodiment of the overall method. Step 302 comprises the key generation step performed by the logic 112 in FIG. 1. Step 304 comprises the optional key type generation and masking processes performed by the logic 112 in FIG. 1, with the key type determined through an access to lookup table 112. For purposes of this disclosure, the term "logic" refers to implementations in hardware, software, or combinations of hardware and software.

Step 306 comprises the two-step indirection mapping process, wherein the first step involves searching or having performed a search through table 120, which may or may not be stored on a CAM, to find the entry 120*b* whose content value matches the key 118, and the second step involves locating the entry 124*b* in the associated data store 124, typically a RAM, whose index value matches the index value 122 of the matching entry in the table 120. Step 308 comprises outputting the virtual router identifier (VRID) 102. In FIG. 1, this step involves outputting the content value, or a designated field in the content value, of the entry 124*b* whose index value matches the index value 122 of the matching entry in the table 120.

Steps 306 and 308 are performed by logic 126 (illustrated in FIG. 1) through suitable accesses to table 120 and associated data element 124, as indicated by the dotted arrows between these elements.

Step 310 comprises configuring the device to have the particular configuration identified by the virtual router identifier. In one embodiment, this step is performed by logic 128 (illustrated in FIG. 1) when it selects or generates the CAM searching key that is used in making a classification and forwarding decision for the packet. By setting the key that is used throughput the classification and forwarding process, the logic 128 in effect selects a routing table from a plurality of routing tables for use in routing the packet. Conceptually, the process is as illustrated in FIG. 5, which shows selecting a routing table, for example, table 504, from a plurality of possible routing tables 502, 504, 506 responsive to the VRID, and preparing to forward the packet of interest using the selected routing table.

Referring back to FIG. 3, step 312 comprises forwarding the packet in accordance with the configured device. In one embodiment, this step is performed by a packet processor in the device. For purposes of this disclosure, the term "processor" refers to any device capable of executing one or more commands, instructions or state transitions, and includes, without limitation, a general- or special-purpose microprocessor, finite state machine, controller, computer, digital signal processor (DSP), or the like.

Figure 4:
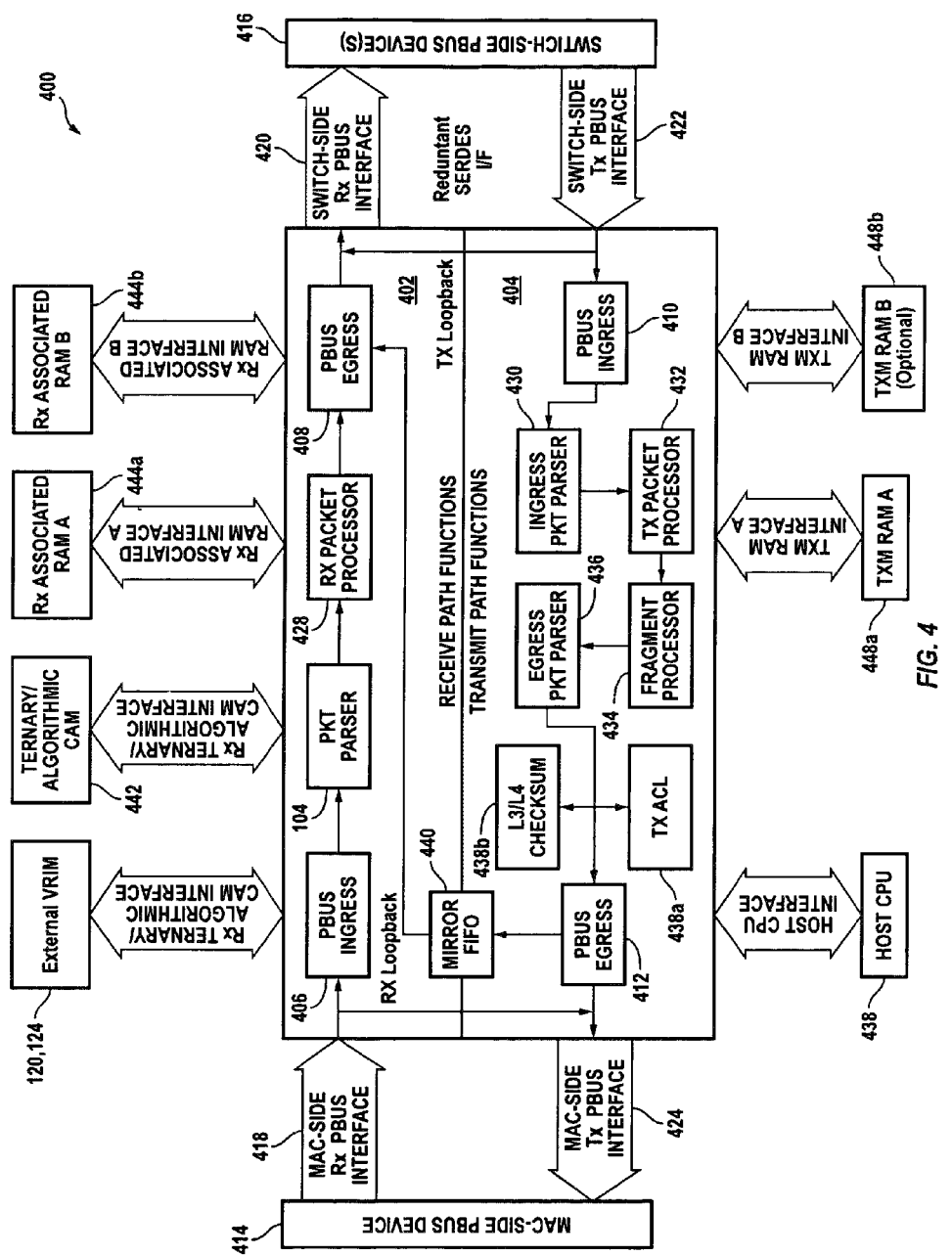
FIG. 4 illustrates a particular switch architecture that embodies or utilizes the claimed method and system.

FIG. 4 illustrates an embodiment 400 of a particular router architecture in which the aforementioned method may operate. In this embodiment, as shown, the router is structured as a packet processing system comprising a packet classification/forwarding system 402 and a packet modification system 404. The packet classification/forwarding system 402 has an ingress portion 406 and an egress portion 408 through which ingress (network-side) packets may respectively enter and exit the packet classification/forwarding system 402. Similarly, the packet modification system 404 has an ingress portion 410 and an egress portion 412 through which egress (switch-side) packets may respectively enter and exit the packet modification system 404.

The ingress portion 406 of the packet classification/forwarding system 402 is coupled, through interface 418, to one or more network-side devices 414, and the egress portion 408 of the packet classification/forwarding system 402 is coupled, through interface 420, to one or more switch-side devices 416. Similarly, the ingress portion 410 of the packet modification system 404 is coupled, through interface 422, to the one or more switch-side devices 416, and the egress portion 412 of the packet modification system 404 is coupled, through interface 423, to the one or more network-side devices 414.

In addition to the ingress and egress portions 406, 408, the packet classification system 402 further comprises a first packet parser 104 (the same packet parser 104 illustrated in FIG. 1), and a packet processor 428.

Parser 104 is configured to parse an ingress packet and provide context pointers to the beginning of the packet layers, for example, pointers to the beginning of OSI layers 2, 3, and 4.

Packet processor 428 is configured to classify and forward the packet, responsive to the context pointer provided by parser 104.

Content Addressable Memory (CAM) 442 is used by the packet classification/forwarding system 402 to perform packet searches to arrive at a classification/forwarding decision for a packet. The CAM 442 may be ternary, binary, or a combination of binary and ternary.

The associated RAMs (ARAMs) 444*a*, 44*b* provide associated data for each entry in the CAM 442. The ARAMs 444*a*, 444*b* are accessed using the address (index value) returned by the CAM 442 as a result of a search operation. The ARAM 444*a*, 444*b* entry data is used to supply intermediate classification/forwarding information for the packet that is used by the packet processor 428 in making a final classification/forwarding decision for the packet.

The table 120, which may or may not be stored on a CAM, and the associated data store 124, which collectively may be referred to as a Virtual Router Indirection Mapper (VRIM), are the same elements previously discussed in relation to FIG. 1.

In addition to the ingress and egress portions 410, 412, the packet modification system 404 further comprises a second packet parser 430 for parsing an egress packet, modification processor 432, a fragment processor 436, a third packet parser 436, Access Control Logic ("ACL") 438*a*, and L3/L4 checksum logic 438*b*.

Parser 430 is configured to parse an egress packet and provide context pointers to the beginning of the packet layers, for example, pointers to the beginning of OSI layers 2, 3, and 4.

Modification processor 432 modifies some or all of an egress packet responsive to the context pointers provided by parser 430, in the process disassembling the packet into fragments. Fragment processor 436 re-assembles the fragmented packet.

The modification RAMs ("MRAMs") 448*a*, 448*b* provides data and control structures for packet modification operations performed by the modification processors 432*a*, 432*b*.

Parser 436 is configured to parse the reassembled packet and provide context pointers to the beginning of the packet layers, for example, pointers to the beginning of OSI layers 2, 3, and 4.

ACL logic 438*b* arrives at an ACL decision with respect to a packet, such as CPU copy, mirror copy; and kill, responsive to the parsed packet layers provided by parser 436. The CPU copy action forwards a copy of the packet to a host 438 coupled to the system. The minor copy action implements an egress mirroring function, in which a copy of the packet is forwarded to mirror FIFO 440 and then on to the egress portion 408 of the packet classification/forwarding system 402. The kill action either kills the packet or marks it for killing by a downstream Medium Access Control (MAC) processor.

L3/L4 checksum logic 438*b* is configured to compute a checksum for a modified packet. In one embodiment, logic 438*b* is configured to independently calculate a layer three (IP) and layer four (TCP/UDP) checksum.

In one implementation, the interfaces 418, 420, 422, 424, and one or more of the CAM, VRIM, ARAM, or MRAM interfaces (not identified, may be a QDR- or DDR-type interface as described in U.S. patent application Ser. No. 10/655, 742, filed Sep. 4, 2003, which is hereby fully incorporated by reference herein as though set forth in full.

In one embodiment, the logic elements depicted in FIG. 1 are incorporated into the router of FIG. 4 within the forwarding and classification system 402, just downstream from the packet parser 104 and parallel with the packet processor 428. In this embodiment, logic 112 in FIG. 1 performs the key generation step 302 of FIG. 3 responsive to parsed packet data provided by parser 104. Logic 112 also performs the optional key type generation and masking step 304 if a ternary CAM is not included in the VRIM 120, 124 and used as part of the indirection mapping process 306. If a ternary CAM is included in the VRIM 120, 124, and used as part of the indirection mapping process 306, the key type generation and masking step 304 may be performed by this CAM. Logic 126 further performs the indirection mapping process 306 in conjunction with the elements of VRIM 120, 124, as well as the VRID outputting step 308.

Packet processor 428 performs the configure device step 310 of FIG. 3 by using the VRID as the starting key to CAM 442, which determines the starting address of a sequence of commends executed by the packet processor 306 to make a classification and forwarding decision for an ingress packet. By using the VRID as the starting key to the CAM 442, the packet processor 428 implicitly selects a routing table from a plurality of possible routing tables, as illustrated in FIG. 5.

Packet processor 428 also performs step 312 by classifying and forwarding the ingress packet responsive to the CAM searching process that is performed, at least initially, with the key determined responsive to the VRID 102.

While various embodiments of the invention have been described, it will be apparent to those of ordinary skill in the art that many more embodiments and implementations are possible that are within the scope of this invention. Accordingly, the invention is not to be restricted except in light of the attached claims and their equivalents.

What is claimed is:

1. A method in a network device for presenting different virtual routers to different end users within a common Virtual Local Area Network (VLAN), wherein the method comprises:

receiving an incoming packet having a VLAN field identifying the common VLAN and at least one additional packet field;

forming a key from the VLAN field and the at least one additional packet field;

mapping the key to a virtual router identifier (VRID), wherein the VRID specifies one virtual router configuration among a plurality of possible virtual router configurations;

configuring the networking device to present the one virtual router configuration specified by the VRID by selecting a routing table that characterizes the virtual router configuration specified by the VRID for use in routing the incoming packet; and routing the incoming packet using the selected routing table that characterizes the virtual router configuration specified by the VRID, wherein the number of possible virtual routers presented to the different end users is increased by mapping multiple different key values into the same VRID through appropriate settings of index values for the networking device.

2. The method of claim 1, further comprising masking the key using a key type determined responsive to one or more packet fields of the incoming packet.

3. The method claim 2, wherein the key type is determined by inputting an ingress port field of the incoming packet to a lookup table.

4. The method of claim 2, wherein the key type functions as a mask, by indicating which of any fields utilized in forming the key are to be wild-carded/ignored in subsequent processing, and which of any fields utilized in forming the key are to be used in the subsequent processing.

5. The method of claim 4, wherein each of the fields utilized in forming the key can be independently wild-carded or not wild-carded.

6. The method of claim 1, wherein the at least one additional packet field comprises a Virtual Metropolitan Network (VMAN) field, distinct from the VLAN field identifying the common VLAN.

7. The method of claim 1, wherein the key formed from the VLAN field and the at least one additional packet field comprises a size in excess of the VLAN field and further allows the VLAN field to be used for virtual routing purposes, wherein a number of virtual routers that can be presented is limited by a memory's size used to perform packet searches to arrive at a routing decision, and further wherein the number of virtual routers that can be presented is not dependent upon the VLAN field's size.

8. The method of claim 7, wherein the VLAN field is limited to 12 bits and identifies a maximum of 4K of different routing tables, and wherein the key formed from the VLAN field and the at least one additional packet field comprises a size in excess of the VLAN field.

9. The method of claim 7, wherein the VLAN field is an extended VLAN field or a super VLAN field.

10. The method of claim 1, wherein configuring the networking device to present the one virtual router configuration specified by the VRID by selecting the routing table that characterizes the virtual router configuration specified by the VRID for use in routing the incoming packet comprises:

accessing a table having a plurality of entries, each entry having a content value and an index value;

locating an entry having the content value that matches the key formed;

mapping the index value of the matching entry into the VRID using an associated data store element; and selecting an entry in the associated data store element having an index value that matches the index value for the matching entry in the table, wherein the entry from the associated data store is, or contains, the VRID.

11. A networking device having a packet processor for executing one or more commands, instructions or state transitions to present different virtual routers to different end users within a common Virtual Local Area Network (VLAN), wherein executing the one or more commands, instructions or state transitions causes the networking device to further:

receive an incoming packet having a VLAN field identifying the common VLAN and at least one additional packet field;

form a key from the VLAN field and the at least one additional packet field;

map the key to a virtual router identifier (VRID), wherein the VRID specifies one virtual router configuration among a plurality of possible virtual router configurations;

configure the networking device to present the one virtual router configuration specified by the VRID by selecting a routing table that characterizes the virtual router configuration specified by the VRID for use in routing the incoming packet; and route the incoming packet using the selected routing table that characterizes the virtual router configuration specified by the VRID, wherein the number of possible virtual routers presented to the different end users is increased by mapping multiple different key values into the same VRID through appropriate settings of index values for the networking device.

12. The networking device of claim 11, wherein executing the one or more commands, instructions or state transitions further causes the networking device to:

mask the key using a key type determined responsive to one or more packet fields of the incoming packet.

13. The networking device of claim 12, wherein the key type functions as a mask, by indicating which of any fields utilized in forming the key are to be wild-carded/ignored in subsequent processing, and which of any fields utilized in forming the key are to be used in the subsequent processing, and wherein each of the fields utilized in forming the key can be independently wild-carded or not wild-carded.

14. The networking device of claim 11, wherein the at least one additional packet field comprises a Virtual Metropolitan Network (VMAN) field, distinct from the VLAN field identifying the common VLAN.

15. The networking device of claim 11, wherein the key formed from the VLAN field and the at least one additional packet field comprises a size in excess of the VLAN field and further allows the VLAN field to be used for virtual routing purposes, wherein a number of virtual routers that can be presented is limited by a memory's size used to perform packet searches to arrive at a routing decision, and further wherein the number of the virtual routers that can be presented is not dependent upon the VLAN field's size.

16. The networking device of claim 11, wherein executing the one or more commands, instructions or state transitions causes the networking device to configure the networking device comprises:

accessing a table having a plurality of entries, each entry having a content value and an index value;

locating an entry having the content value that matches the key formed;

mapping the index value of the matching entry into the VRID using an associated data store element; and selecting an entry in the associated data store element having an index value that matches the index value for the matching entry in the table, wherein the entry from the associated data store is or contains the VRID.

17. The networking device of claim 16, wherein the table is stored on a Content Addressable Memory (CAM), and wherein locating the entry having the content value that matches the key formed comprises searching the CAM for, and locating the entry in the CAM.

18. Non-transitory instructions of a networking device that, when executed by a processor, the non-transitory instructions cause the networking device to perform operations comprising:
- receiving an incoming packet having a VLAN field identifying a common VLAN and at least one additional packet field;
- forming a key from the VLAN field and the at least one additional packet field;
- mapping the key to a virtual router identifier (VRID), wherein the VRID specifies one virtual router configuration among a plurality of possible virtual router configurations;
- configuring the networking device to present the one virtual router configuration specified by the VRID by selecting a routing table that characterizes the virtual router configuration specified by the VRID for use in routing the incoming packet; and
- routing the incoming packet using the selected routing table that characterizes the virtual router configuration specified by the VRID, wherein the number of possible virtual routers presented to different end users is increased by mapping multiple different key values into the same VRID through appropriate settings of index values for the networking device.

19. The non-transitory instructions of claim 18, further comprising:
- masking the key using a key type determined responsive to one or more packet fields of the incoming packet.

20. The non-transitory instructions of claim 19, wherein the key type functions as a mask, by indicating which of any fields utilized in forming the key are to be wild-carded/ignored in subsequent processing, and which of any fields utilized in forming the key are to be used in the subsequent processing, and wherein each of the fields utilized in forming the key can be independently wild-carded or not wild-carded.

* * * * *